US012649297B2

(12) United States Patent
Martin

(10) Patent No.: US 12,649,297 B2
(45) Date of Patent: Jun. 9, 2026

(54) SEAM FOR AN INDUSTRIAL TEXTILE WITH ENERGY ABSORBENT YARNS

(71) Applicant: AstenJohnson International, Inc., Charleston, SC (US)

(72) Inventor: Chad Aaron Martin, Appleton, WI (US)

(73) Assignee: AstenJohnson International, Inc., Charleston, SC (US)

( * ) Notice: Subject to any disclaimer, the term of this patent is extended or adjusted under 35 U.S.C. 154(b) by 517 days.

(21) Appl. No.: 17/925,063

(22) PCT Filed: May 10, 2021

(86) PCT No.: PCT/US2021/031493
§ 371 (c)(1),
(2) Date: Nov. 14, 2022

(87) PCT Pub. No.: WO2021/236366
PCT Pub. Date: Nov. 25, 2021

(65) Prior Publication Data
US 2023/0182438 A1     Jun. 15, 2023

Related U.S. Application Data

(60) Provisional application No. 63/027,096, filed on May 19, 2020.

(51) Int. Cl.
*D03D 15/283* (2021.01)
*B32B 5/02* (2006.01)
(Continued)

(52) U.S. Cl.
CPC .............. *B32B 5/263* (2021.05); *B32B 5/024* (2013.01); *D03D 15/283* (2021.01); *D03D 15/587* (2021.01); *D06M 10/005* (2013.01); *D21F 7/083* (2013.01); *D21F 7/10* (2013.01); *B32B 2250/20* (2013.01); *B32B 2262/0215* (2013.01); *B32B 2262/0261* (2013.01);
(Continued)

(58) Field of Classification Search
None
See application file for complete search history.

(56) References Cited

U.S. PATENT DOCUMENTS 8,062,480 B2    11/2011  Eagles
2007/0028997 A1    2/2007  Best et al.
(Continued)

FOREIGN PATENT DOCUMENTS

CN    105814257 A    7/2016
CN    109477305 A    3/2019
(Continued)

*Primary Examiner* — Arti Singh-Pandey
(74) *Attorney, Agent, or Firm* — Volpe Koenig

(57) ABSTRACT

A woven fabric seam area is provided including a top surface and a bottom surface, with the woven fabric being formed of warp yarns interwoven with weft yarns in a repeating pattern, and either the warp yarns or the weft yarns are formed at least in part of a laser energy absorbent material. Within the fabric seam area yarns formed of laser energy transparent material can be bonded to yarns being formed at least in part of a laser energy absorbent material by laser welds in order to maintain or achieve a desired flexibility and/or shear resistance of the fabric. A method of forming such a fabric seam area is also provided.

11 Claims, 9 Drawing Sheets

(51) Int. Cl.

| | |
|---|---|
| *B32B 5/26* | (2006.01) |
| *D03D 15/587* | (2021.01) |
| *D06M 10/00* | (2006.01) |
| *D06M 101/32* | (2006.01) |
| *D21F 7/08* | (2006.01) |
| *D21F 7/10* | (2006.01) |

(52) U.S. Cl.

CPC ................. *B32B 2262/0284* (2013.01); *B32B 2262/0292* (2013.01); *D06M 2101/32* (2013.01); *D10B 2331/04* (2013.01); *D10B 2505/00* (2013.01)

(56) References Cited

U.S. PATENT DOCUMENTS

| | | | |
|---|---|---|---|
| 2008/0076311 | A1 | 3/2008 | Davenport et al. |
| 2012/0031554 | A1 | 2/2012 | Eagles |
| 2013/0034680 | A1 | 2/2013 | Manninen |
| 2013/0333792 | A1 | 12/2013 | Eberhardt et al. |
| 2014/0069549 | A1 | 3/2014 | Ryan et al. |
| 2014/0186579 | A1 | 7/2014 | Botelho et al. |
| 2015/0096704 | A1 | 4/2015 | Straub et al. |
| 2016/0312407 | A1 | 10/2016 | Zou et al. |
| 2020/0063344 | A1 | 2/2020 | Patel et al. |

FOREIGN PATENT DOCUMENTS

| | | |
|---|---|---|
| DE | 102012207016 A1 | 10/2013 |
| WO | 2009032271 A2 | 3/2009 |

SEAM FOR AN INDUSTRIAL TEXTILE WITH ENERGY ABSORBENT YARNS

INCORPORATION BY REFERENCE

The following documents are incorporated herein by reference as if fully set forth: PCT/US2021/031493, filed May 10, 2021 and U.S. Provisional Patent Application No. 63/027,096, filed May 19, 2020.

BACKGROUND

The invention relates to industrial textiles, including papermaking fabrics, and particularly to forming fabrics and TAD fabrics, and more particularly to seams of such industrial textiles.

Both forming fabrics and TAD fabrics are typically flat woven from polymeric yarns or monofilaments, and the ends of a length of the woven fabric are then joined together by a seam in order to form an endless loop. The seams may be formed by unweaving and reweaving the ends of the yarns forming the fabric together so that there are no, or only limited, discontinuities in the fabric and its properties at the seam. This leaves terminations of the machine direction (MD) yarns, typically directed to the machine side of the fabric.

Papermaking machines operate at high speeds with tensions that oscillates causing MD oriented tensile stress. The seam of a fabric is typically weaker than the body of the fabric and is therefore more easily affected by the stress while the machines are in operation. While under tension the MD yarn terminations may slip from their original position enough to either protrude past the papermaking surface causing damage to the product being made or to separate far enough from their original position that a seam failure occurs and the entire fabric splits apart in the cross-machine direction (CD).

Traditional methods of seaming forming and TAD fabrics rely on friction to keep the seam together as the MD and CD yarns cross each other in the seam area. More recently it has become known in the art of papermaking fabrics to fuse yarns together, particularly through the use of laser welding thermoplastic materials, in order to obtain improved seam strength and reduced movement of seam terminations.

U.S. Pat. No. 8,062,480 discloses a process for producing papermaker's and industrial fabric seam, and a seam produced by the process. Laser energy is used to weld or melt certain points in industrial fabrics.

US 2015/0096704 discloses a stabilized woven seam for flat-weave endless fabric belts, which includes machine-direction (MD) yarns and cross-machine-direction (CD) yarns. The fabric belt has two ends that are connected in a seam region by bringing together end sections of the MD yarns in pairs which form junction points. These MD yarns are also woven with CD yarns in the seam region. Part of the yarns includes yarns that are made of a thermoplastic polymer material which is transparent to light of a certain range of wavelengths (i.e. laser). In the seam region, a bond is formed at yarn contact points by absorption of laser energy. In the seam region, a plurality of spaced-apart, strip-shaped fabric sections are formed in the following pattern: one strip-shaped fabric section without junction points is formed between two adjacent fabric sections having junction points.

US 2013/0333792 A1 discloses a stabilized fabric seam for flat-woven continuous fabric belts having intersecting yarns. Within the fabric seam region, there are at least two strip-shaped regions which extend over the entire width of fabric seam and contain meeting points. These points are arranged between the strip-shaped regions in which there are crossovers between MD and CD yarns. The crossovers are connected by transmission welding.

US 2007/0028997 A1 discloses a forming fabric for use in a paper machine, along with a method and apparatus for manufacturing the forming fabric. In order to increase stability, crossing yarns are engaged with one another at crossing points and in which some of the yarns are fused to one another. The latter is accomplished by the fact that in crossing first and second yarns, the first yarns absorb laser energy such that their surface melts, and subsequently the first and second yarns are fused to one another.

US 2020/0063344 A1 discloses an endless fabric belt having a seam region comprising MD threads, CD threads interwoven with the MD threads, and termination zones distributed throughout the entire seam region. Up to 75% of the CD threads are fusible and are distributed in various patterns throughout the seam area. A plurality of the termination zones further comprise at least one fusible CD thread attached to the MD thread in the termination zone.

Uniformity of air permeability and fabric contact with the TAD roll on a micro scale is desirable to ensure that heat transfer and drying are uniform throughout the paper web. This requires the fabric to have uniform air permeability and flexibility in both the machine and cross-machine direction. Fusing yarns in concentrated areas may cause localized discontinuities in the fabric air permeability and flexibility which may cause marking of the paper due to differences in air flow or heat transfer. Similarly, fusing yarns throughout the entire seam area, or in dense sections throughout the seam, could also result in undesirable sheet defects as well as runnability issues due to sudden changes in fabric shear properties.

Another important fabric property to maintain is uniformity of fabric shear modulus in the plane of the fabric. Shear modulus is a measure of the ability to resist distortion in the fabric XY plane when a shear load is applied.

It is important to provide a fabric with a seam area that retains fabric characteristics, specifically air permeability and caliper. This should be achieved while also providing uniformity of stiffening, particularly no concentrated areas of high or low stiffness.

It would be desirable to provide a fabric with a seam area that overcomes the problems of the prior art by providing a solution to allow selective adhesion between warp yarns and weft yarns throughout the seam in order to provide a desired flexibility and/or shear resistance of the assembled fabric, as well as to minimize the strength and uniformity differential between the body of the fabric and the seam area.

SUMMARY

In one aspect, there is provided a fabric having a seam region, the seam region comprising warp yarns interwoven with weft yarns in a repeating pattern, with termination zones distributed throughout the seam region, where either all of the warp yarns or all of the weft yarns, but not both, have been formed at least in part of a laser energy absorbent material.

The fabric having a seam region can be a single layer weave or a multilayer weave.

In one embodiment, a single layer fabric is provided with all of the weft yarns being formed at least in part of the laser energy absorbent material. Here, preferably, the warp yarns are formed of a laser energy transparent material and the warp yarns are connected to the weft yarns formed at least in part of the laser energy absorbent material at points where the warp yarns pass between the energy being applied and the weft yarns formed at least in part of the laser energy absorbent material.

In another embodiment, a single layer fabric is provided with all of the warp yarns or all of the weft yarns being formed at least in part of the laser energy absorbent material includes only all of the warp yarns being formed at least in part of the laser energy absorbent material. Here, preferably, the weft yarns are formed of the laser energy transparent material and the weft yarns are connected to the warp yarns formed at least in part of the laser energy absorbent material at points where the weft yarns pass between the energy being applied and the warp yarns formed at least in part of the laser energy absorbent material.

Preferably, the warp yarns and the weft yarns are formed of a thermoplastic material. The thermoplastic material may be a polyamide, a polyethylene terephthalate, a polyurethane, or a blend such as that of a polyethylene terephthalate and a thermoplastic elastomer.

The yarns formed at least in part of the laser energy absorbent material, further comprise an additive material. One preferred laser energy absorbent material comprises carbon black. This is mixed with the thermoplastic material used to form either all of the warp yarns or all of the weft yarns that are formed at least in part of the laser energy absorbent material. Other laser energy absorbent materials may include graphite, carbon nanotubes, and metal oxides. Other energy absorbent additives may also be know. The additive may be added in a range of from about 0.1 wt % to about 3 wt % of the weight of the CD yarn. Preferably, the additive may be added in a range of from about 0.3 wt % to about 1 wt % of the weight of the CD yarn. Other laser energy absorbent materials could also be used.

The selection of the warp or weft yarns formed at least in part of the laser energy absorbent material and weave pattern can be used to define a number of welds between the crossing warp and weft yarns, which can be used to affect the flexibility and/or shear resistance of the fabric assembly.

In a preferred embodiment, the weft yarns are formed at least in part of the laser energy absorbent material, the warp yarns are transparent to laser energy, and at least part of the warp yarns are laser-welded to the weft yarns formed at least in part of the laser energy absorbent material. Furthermore, the weft yarns formed at least in part of the laser energy absorbent material may comprise carbon, in the form of graphite, carbon black, or carbon nanotubes. Preferably, the weft yarns formed at least in part of the laser energy absorbent material comprise carbon black.

In another embodiment, a multilayer fabric is provided where at least one fabric seam area surface comprises at least one yarn type of the outer surface layer where all yarns of that yarn type are formed of laser transparent material, and at least one yarn type of a different direction of the outer surface layer where all yarns of that yarn type are formed at least in part of laser absorbent material. Laser energy may be applied to the fabric seam area on either the support side surface, the machine side surface, or both surfaces. At least one surface of the fabric seam area where the laser energy is applied comprises at least one yarn type where all yarns of that yarn type are formed of laser transparent material, and at least one yarn type of a different direction where all yarns of that yarn type are formed at least in part of laser absorbent material. Here, as an example, one surface of the fabric seam area may comprise first and second systems of weft yarns, each being formed from different yarn types, where all of the weft yarns in the first system of weft yarns are formed at least in part of a laser absorbent material while all of the weft yarns in the second system of weft yarns are formed of laser energy transparent material, and all of the warp yarns are formed of the laser energy transparent material. The energy transparent yarns in one direction and the energy absorbent yarns in the other direction are of a similar enough composition that they would bond together during the welding process. These materials could be composed of one material or a blend of materials.

In another aspect, a method of making a fabric with a seam area, is also provided, and includes the steps of:
    weaving the fabric from warp yarns and weft yarns interwoven in a repeating pattern, where either all of the warp yarns or all of the weft yarns are formed at least in part of a laser energy absorbent material, and for the other of the warp yarns or the weft yarns not formed at least in part of the laser energy absorbent material, all of the warp yarns or the weft yarns are formed of a laser energy transparent material;
    assembling the warp ends into termination zones throughout the fabric seam area; and
    applying laser energy to at least one surface of the fabric seam area, creating bonds between the yarns of the laser energy transparent material and the yarns formed at least in part of the laser energy absorbent material at points within the fabric seam area where the yarns of the laser energy transparent material pass between the energy being applied and the yarns formed at least in part of the laser energy absorbent material.
    The laser energy may be applied to either the support side surface, or the machine side surface, or both surfaces.
    Further aspects of the invention are discussed below and in the claims.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION

Certain terminology is used in the following description for convenience only and is not limiting. The fabric seam area 20 according to the invention is that of a woven industrial textile, which can have many industrial applications, such as conveyor belts, etc. The words "support side" and "machine side" designate surfaces of the fabric with reference to their use in one preferred application in a conveying application; however, these terms merely represent first and second, top and bottom, or upper and lower surfaces of the planar fabric. "Yarn" is used to generically identify a monofilament or multifilament fiber. "Warp" and "weft" are used to designate yarns or monofilaments based on their position in the loom that extend in perpendicular directions in the fabric and either could be a machine direction (MD) or cross-machine direction (CD) yarn in the fabric once it is installed on a piece of equipment, depending on whether the fabric is flat woven or continuously woven. In the preferred arrangement, the woven fabric seam area 20 is flat woven and seamed at the warp ends in order to form a continuous belt, so that the warp yarns are MD yarns and the weft yarns are CD yarns. Regardless of how the woven fabric seam area 20 is made, the designations of warp, weft and/or MD and CD as used in the description that follows can be interchanged.

Figure 3:
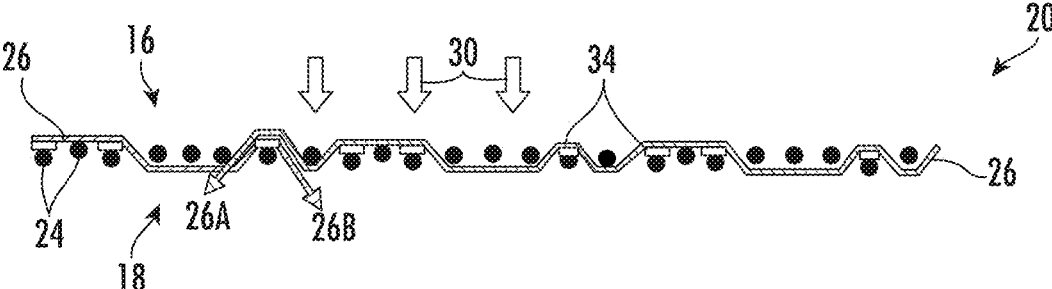
FIG. 3 is a schematic cross-sectional view showing the fabric seam area according to a first embodiment of the invention.

One preferred application of the fabric seam area 20 according to the invention provides a support side surface 16 and a machine side surface 18 as shown in FIG. 3. A preferred application of such a fabric seam area is for use in papermaking fabrics, such as forming fabrics, TAD fabrics, press fabrics, and dryer fabrics that are used in papermaking machines. Further applications may include filter fabrics as well as other industrial applications.

When a system of weft yarns is formed at least in part of laser energy absorbent material it is to be understood that the weft yarns formed at least in part of laser energy absorbent material may only be provided in the seam region of the fabric but may also extend further into the body of the fabric and may even be extended throughout the entire fabric. Seam regions will vary in size however may generally be defined as the region in which the warp yarn ends meet at termination zones. It is understood that when a system of warp yarns is formed at least in part of laser energy absorbent material that these warp yarns extend the entire length of the fabric.

In describing different embodiments of the fabric like element numbers are used for elements having the same function, even if there are minor differences in shape, such as yarns having different cross-sections.

Figure 1:
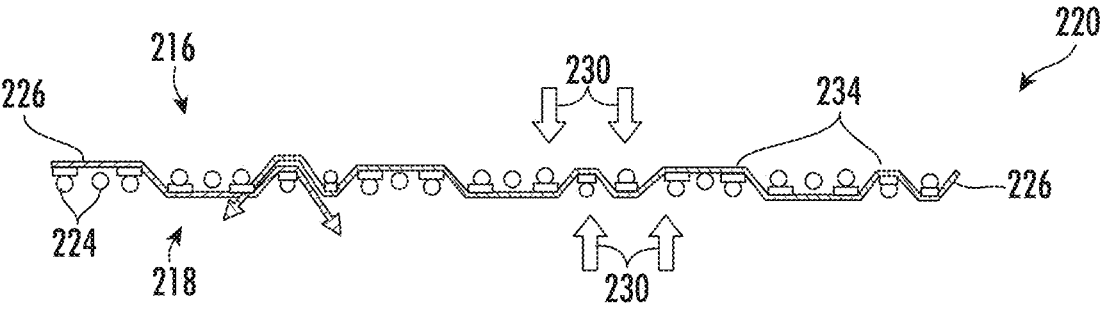
FIG. 1 is a schematic cross-sectional view showing a fabric seam area of the known prior art.

Referring to FIG. 1, a fabric seam area 220 according to known prior art is provided, formed from a woven fabric having CD weft yarns 224 interwoven with MD warp yarns 226. The CD weft yarns 224 and the MD warp yarns 226 are formed from a laser transparent material. A laser-weldable coating is applied to the fabric seam area to create bonds 234 when laser energy 230 is applied. Different bond types will be discussed in detail further below. In this embodiment laser energy 230 is applied to both the support side surface 216 and the machine side surface 218 of the fabric seam area but can be applied also to just one surface or the other. In this example of prior art there is a strong concentration of bonds in the seam area of the fabric making it rigid compared to the body which can result in the seam developing a ridge or crease in a shear condition. This example also creates a differently in air permeability in the seam compared to the body resulting in a different drying rate which is undesirable.

Figure 2:
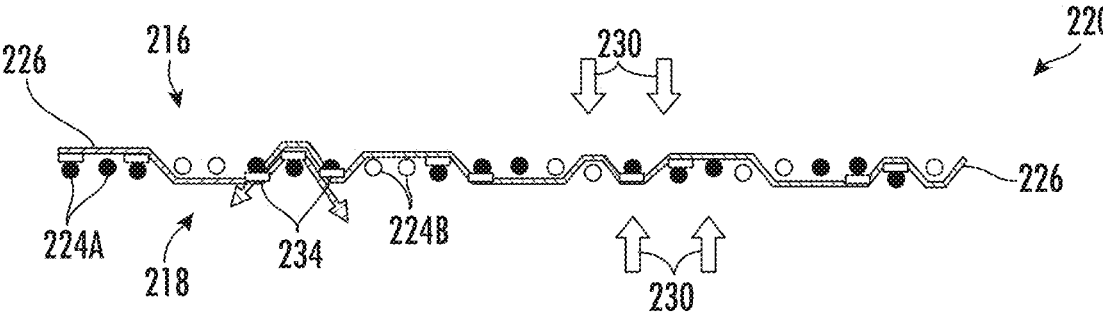
FIG. 2 is a schematic cross-sectional view showing an additional fabric seam area of the known prior art.

Referring to FIG. 2 a fabric seam area 220 according to another known prior art is provided, formed from a woven fabric having CD weft yarns 224 interwoven with MD warp yarns 226. A plurality of the CD weft yarns 224A are formed at least in part with a laser energy absorbent material, while the remaining CD weft yarns 224B and the MD warp yarns 226 are formed of a laser transparent material. In this embodiment laser energy 230 is applied to both the support side surface 216 and the machine side surface 218 of the fabric seam area 220, and forms bonds 234 where the laser energy 230 passes through the MD warp yarns 226 formed of a laser transparent material to the CD weft yarns 224A formed at least in part with a laser energy absorbent material, while no bonds are formed where the laser energy 230 passes through CD weft yarns 224B and MD warp yarns 226, both formed of a laser energy transparent material. In this example of prior art the seam is more flexible than the example in FIG. 1, however CD bands of bonded locations and non bonded locations area formed throughout the seam causing areas of air permeability differential which is undesirable.

Referring to FIG. 3, a first embodiment of a fabric seam area 20 according to the invention will be described in further detail. The fabric seam area 20 is formed from a woven fabric having CD weft yarns 24 interwoven with MD warp yarns 26, with the arrows indicating the ends of the warp yarns 26A and 26B terminating at the machine side surface 18.

Preferably, the CD weft yarns 24 and the MD warp yarns 26 are formed of a thermoplastic material, such as a polyester, and either all of the weft yarns 24 or all of the warp yarns 26, and in the case of the first embodiment, all of the weft yarns 24 are formed at least in part of the laser energy absorbent material. Preferably, in this case the laser energy absorbent material is carbon black which is mixed into the molten material used to form the weft yarns 24. However, as described in further detail below, all of the warp yarns 26, instead of all of the weft yarns 24, can be formed at least in part with the laser energy absorbent material. Bonds 34 are formed where the warp yarns formed with laser transparent material cross between the applied laser energy 30 and the weft yarns formed at least in part of the laser absorbent material. In this embodiment laser energy is applied to the support side surface of the fabric seam area. The energy is applied to the entire area but bonds are only formed as indicated. In this example, bonds are evenly distributed throughout the seam resulting in a desirable airperm profile in both the MD and CD of the seam area. It also provides the desired level of bond sites to strengthen the seam yet still provide the desired flexibility.

Figures 4, 5:
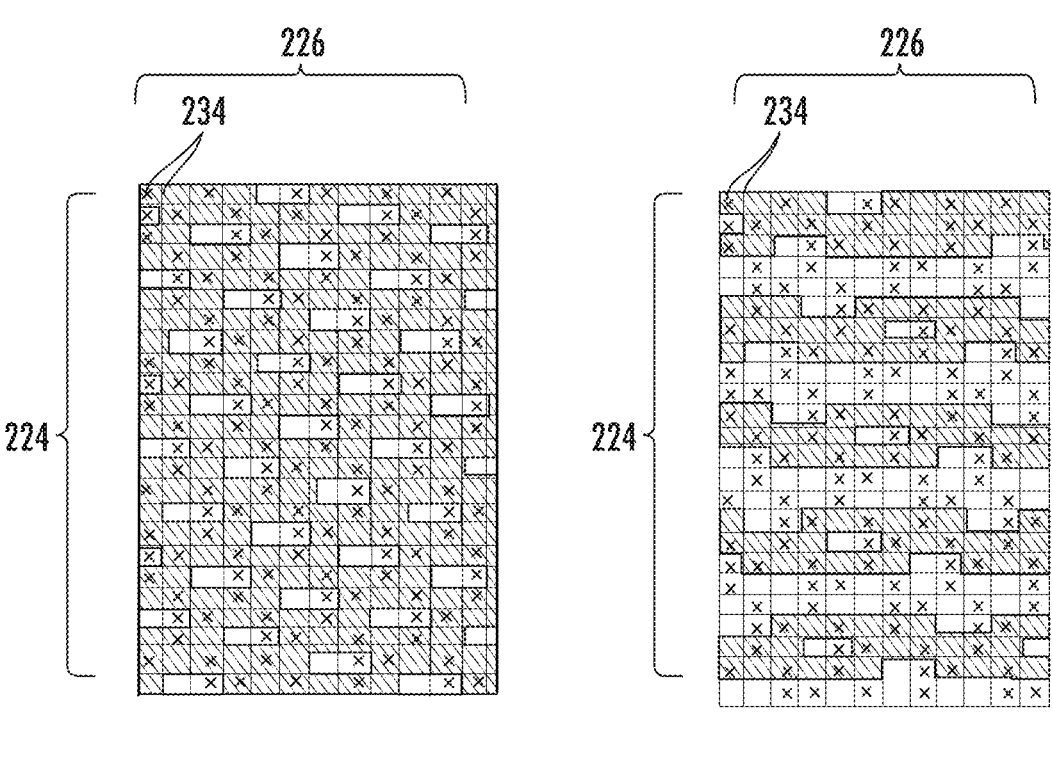
FIG. 4 is a weave pattern diagram overlaid with the pattern of the bond sites within the seam area of the prior art fabric of FIG. 1.
FIG. 5 is a weave pattern diagram overlaid with the pattern of the bond sites within the seam area of the prior art fabric of FIG. 2.
Figure 6:
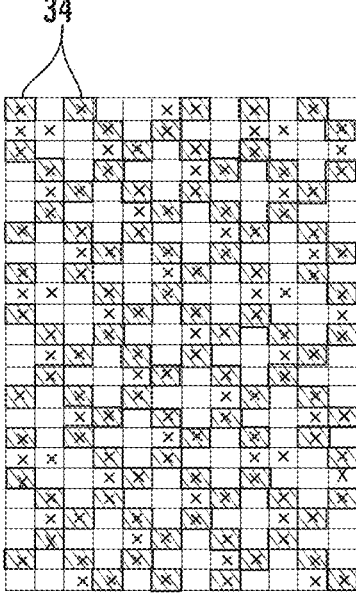
FIG. 6 is a weave pattern diagram overlaid with the pattern of the bond sites within the seam area of the first embodiment of the fabric of FIG. 3.

FIGS. 4 through 6 are weave pattern diagrams of the fabric seam areas 220, 20 as shown in FIGS. 1 through 3 respectively, overlaid with the pattern of the bonds 34 (indicated as the hatched boxes). Locations where a weft yarn passes over a warp yarn are indicated by an empty (no 'X') square in the pattern. Locations where a warp yarn passes over a weft yarn are indicated by an 'X' in a square in the pattern. Locations where a bond 34 occurs are indicated by a shaded square in the pattern. Locations where the square is shaded and contains an 'X' indicate a warp over weft bond. Locations where the square is shaded but is otherwise empty indicate a weft over warp bond. Locations where the square is not shaded, whether it is empty or contains an 'X', indicate either a low wrap where the bond is not effective or no bond at all.

FIG. 4, which is representative of the weave pattern diagram of the weft yarns 124 and warp yarns 126 of the fabric seam area 220 of the first prior art shown in FIG. 1, has a high percentage of bond points, leading to a stiff fabric seam area compared to the body of the fabric.

FIG. 5, which is representative of the weave pattern diagram of the weft yarns 124 and warp yarns 126 of the fabric seam area 220 of the second prior art shown in FIG.

2, has bond points arranged in CD bands resulting in a more flexible seam but causing areas of air permeability differential which is undesirable.

FIG. 6, which is representative of the fabric seam area of the first embodiment of the current invention shown in FIG. 3, has a uniform distribution of bond sites throughout the fabric seam area, providing flexibility and uniform airflow.

Referring to FIG. 7, a second embodiment of a fabric seam area 20' according to the invention will be described in further detail. The fabric seam area 20' is formed from a woven fabric having CD weft yarns 24 interwoven with MD warp yarns 26.

Figures 7A, 7B, 7C:
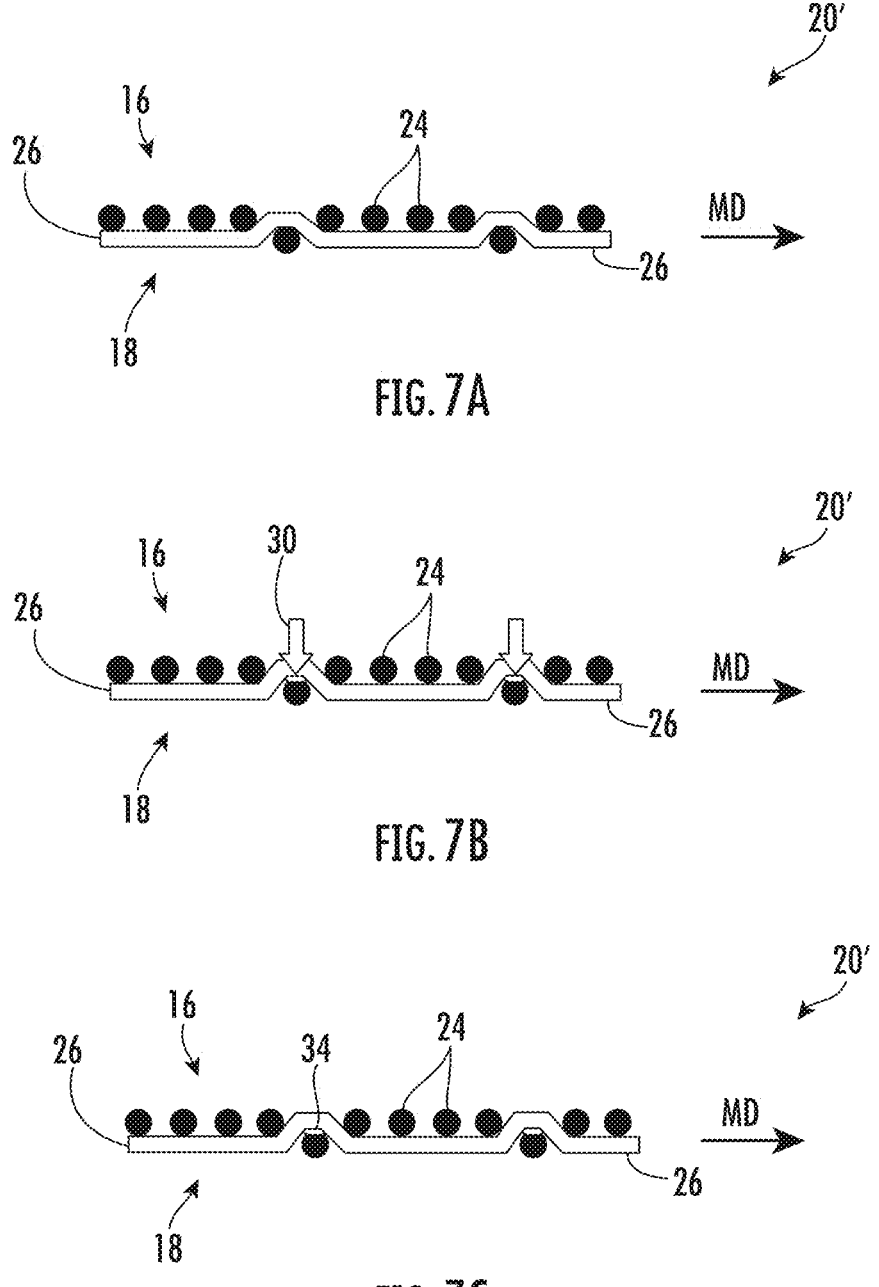
FIG. 7A is a schematic cross-sectional view showing the fabric seam area according to a second embodiment of the invention prior to bonding the various elements of the woven fabric.
FIG. 7B is a cross-sectional view of the fabric seam area similar to FIG. 7A showing bonding energy being applied in order to form bonds between energy transparent MD warp yarns where they pass between the energy being applied and the CD weft yarns which include an energy absorbent material.
FIG. 7C is a cross-sectional view of the fabric seam area that shows the resulting bonds formed after application of laser energy in FIG. 7B.

As shown in FIG. 7B, laser energy 30 is applied to the support surface 16 in order to form bonds 34 as shown in FIG. 7C in the woven fabric seam area 20' at points where the warp yarns 26 which in this embodiment are formed of a laser energy transparent material and do not include any of the laser energy absorbent material, cross over the weft yarns 24 which are formed at least in part of the laser energy absorbent material.

Figure 8:
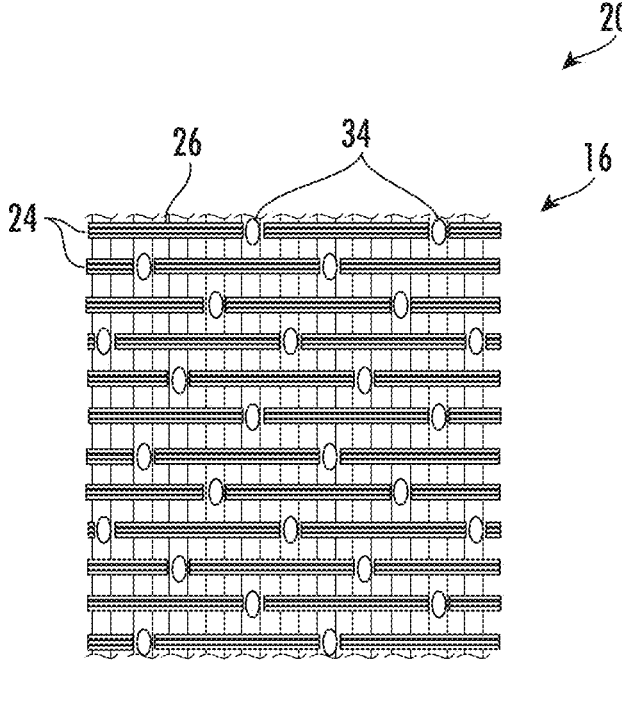
FIG. 8 is a plan view of the top surface of the fabric assembly of FIG. 7C in which the bond locations between the CD weft yarns and the MD warp yarns are shown.

FIG. 8 shows a plan view of the support surface 16 of the fabric of FIGS. 7A-7C where the ovals indicate the bonds 34 formed between various ones of the warp yarns 26 in the woven fabric 20' and the weft yarns 24 which are formed at least in part of the laser energy absorbent material.

This arrangement provides for a controlled level of rigidity of the fabric seam area through laser welding bonds 34 formed between the warp yarns 26 and weft yarns 24, which is a function of the weave pattern and the number of points where the laser energy transparent warp yarns 26 pass between the applied energy and the weft yarns 24 which are formed at least in part of the laser energy absorbent material.

Figure 9A:
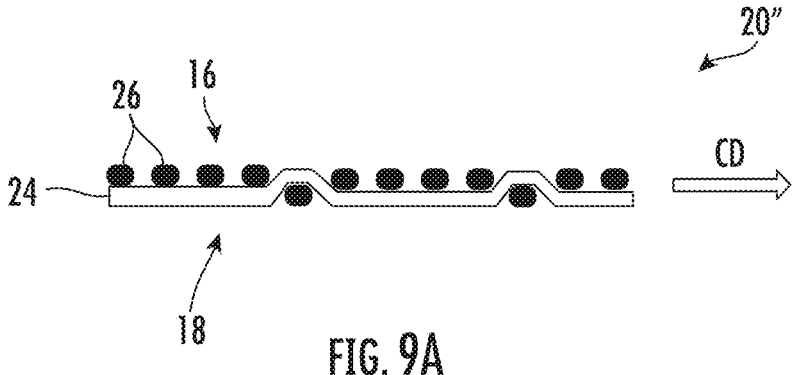
FIG. 9A is a schematic cross-sectional view through a second embodiment of a fabric seam area according to the invention prior to bonding between the various elements of the woven base fabric.
Figure 9B:
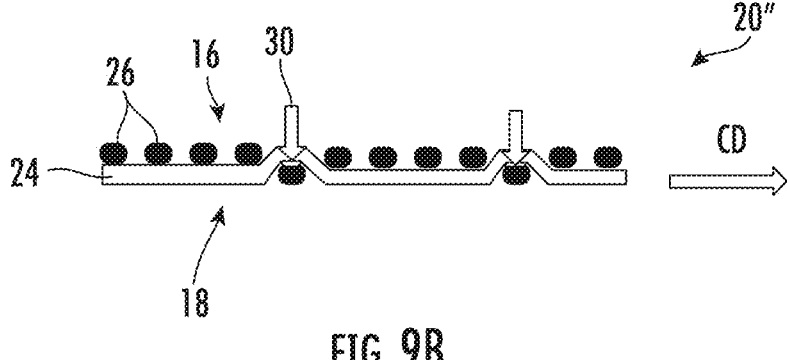
FIG. 9B is a cross-sectional view of the fabric seam area similar to FIG. 9A showing bonding energy being applied in order to form bonds between the energy transparent CD weft yarns where they pass between the energy being applied and the MD warp yarns which include an energy absorbent material.

Referring to FIGS. 9A-9C and 10, a third embodiment of a fabric seam area 20" according to the invention is shown. The fabric seam area 20" is formed in the same manner as the fabric seam area 20' with the difference being that in this case the MD warp yarns 26 have a rectangular cross section are formed at least in part of the laser energy absorbent material, whereas the weft yarns 24 in the first embodiment of the fabric assembly 20' had a circular cross-section and were formed at least in part of the laser energy absorbent material. In a similar manner to the first embodiment of the fabric assembly 20' described above, FIG. 9A shows the woven fabric seam area 20". FIG. 9B shows the application of laser energy 30 in order to form bonds between the laser energy transparent weft yarns 24 where they cross between the applied energy and the warp yarns 26 that are formed at least in part of the laser energy absorbed material, with the resulting laser welds 34 imparting some additional strength to the woven fabric 20".

Figure 9C:
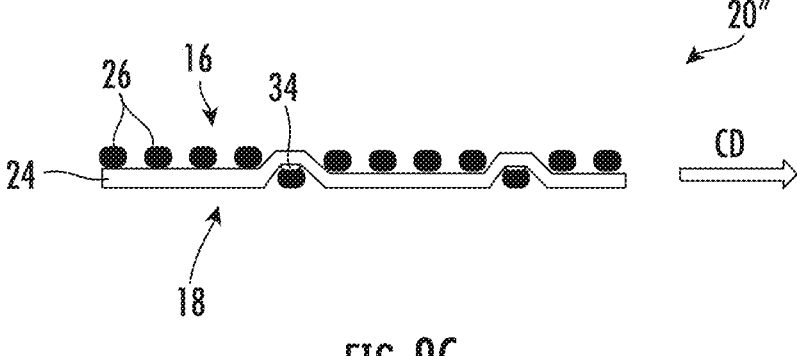
FIG. 9C is a cross-sectional view of the fabric seam area that shows the resulting bonds formed after application of laser energy in FIG. 9B.
Figure 10:
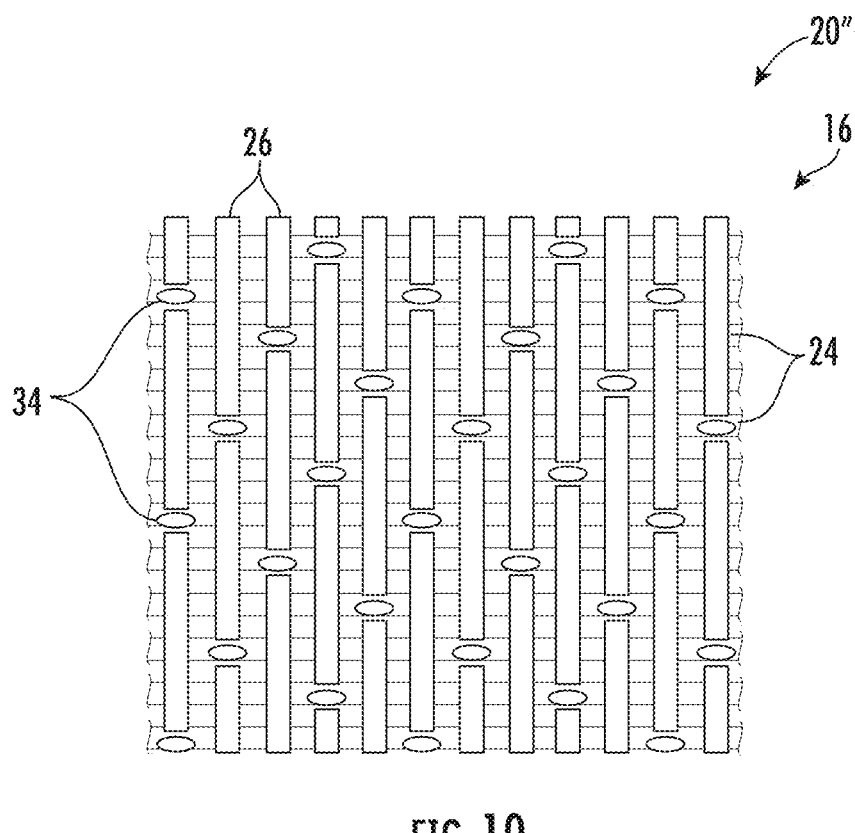
FIG. 10 is a plan view of a top surface of the fabric seam area of FIG. 9C showing the bonds between the CD weft yarns and the MD warp yarns of the fabric.

FIG. 9C shows the finished fabric assembly 20" with the laser welds between weft yarns 24 where they cross between the applied energy and warp yarns 26 that are formed at least in part of the laser energy absorbent material. FIG. 10 shows a plan view of the top surface of the fabric 20" with the bonds 34 between the weft yarns 24 and the warp yarns 26 being indicated.

Figure 11A:
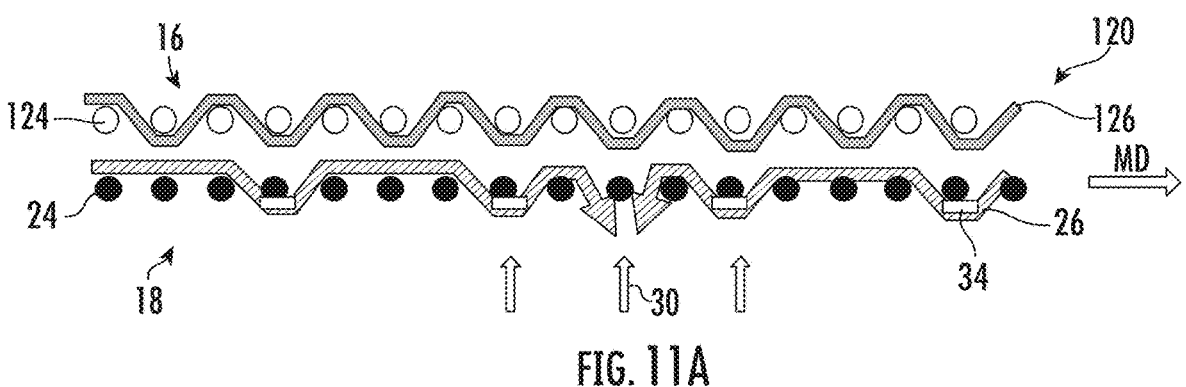
FIG. 11A is a schematic cross-sectional view showing the fabric seam area according to a multilayer embodiment of the invention where laser energy is applied to the machine side surface only.
Figure 11B:
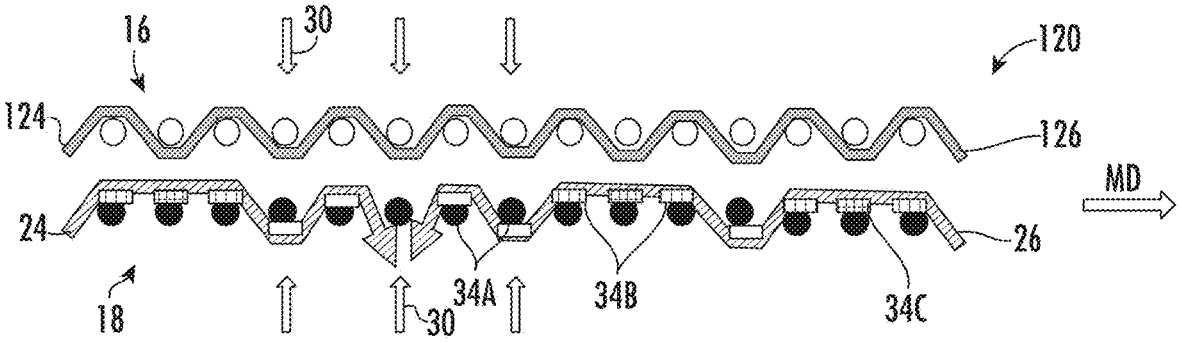
FIG. 11B is a schematic cross-sectional view showing the fabric seam area according to a multilayer embodiment of the invention where laser energy is applied to both the support side surface and the machine side surface.
Figure 11C:
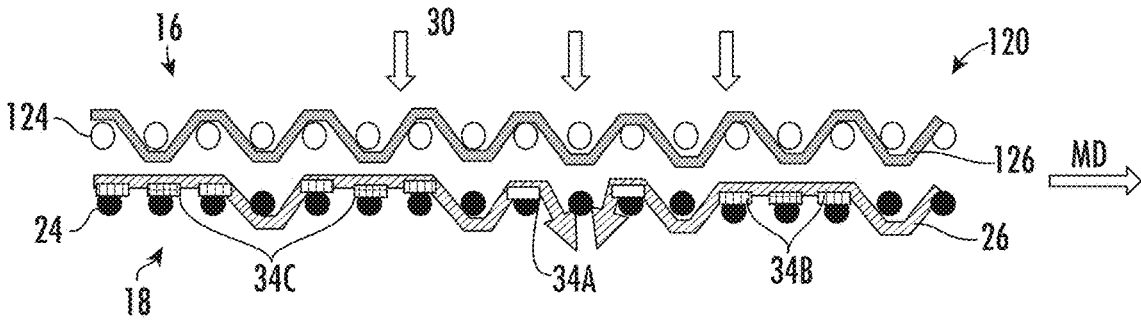
FIG. 11C is a schematic cross-sectional view showing the fabric seam area according to a multilayer embodiment of the invention where laser energy is applied to the support side surface only.

Referring to FIGS. 11A-11C, 12A-12C, and 13A-13C, various multilayer embodiments of a fabric seam area 120, 120', 120" according to the invention are shown. FIGS. 11A-11C provide a multilayer embodiment of a fabric seam area 120 where the system of weft yarns 24 on the machine side surface 18 are formed at least in part of the laser energy absorbent material, while the system of warp yarns 26 on the machine side surface 18 as well as the system of weft yarns 124 and the system of warp yarns 126 on the support side surface 16 are all formed of laser energy transparent material.

FIG. 11A provides laser energy 30 to the machine side surface 18 resulting in bonds 34 between the system of warp yarns 26 and the system of weft yarns 24 at locations at which the system of warp yarns 26 pass under the system of weft yarns 24 formed at least in part of the laser energy absorbent material. FIG. 11B provides laser energy 30 to both the support side surface 16 and the machine side surface 18 resulting in bonds 34 between the system of warp yarns 26 and the system of weft yarns 24 at locations at which the system of warp yarns 26 pass under the system of weft yarns 24 formed at least in part of the laser energy absorbent material as well as at locations at which the system of warp yarns 26 pass over the system of weft yarns 24. FIG. 11C provides laser energy 30 to the support side surface 16 resulting in bonds 34 between the system of warp yarns 26 and the system of weft yarns 24 at locations at which the system of warp yarns 26 pass over the system of weft yarns 24 formed at least in part of the laser energy absorbent material.

FIG. 11B also provides a representation of the different types of bonds 34 that occur between the intersections of the system of weft yarns 24A formed at least in part of the laser energy absorbent material and the system of warp yarns 26 formed of the laser energy transparent material. A full wrap bond 34A (represented as an empty box) occurs when the yarn of one system (in this particular embodiment the system of warp yarns 26) wraps around the yarn of the other system (in this embodiment the system of weft yarns 24A) in such a way that there is contact between the two yarns on either the top or bottom as well as on both sides. A medium wrap bond 34B (represented as a box with vertical hatching) occurs when there is only contact between either the top of bottom and only one side of the two yarns. Where the yarn formed at least in part of the laser energy absorbent material only contacts the yarn formed of the laser transparent material on either the top of bottom surface of the yarn it is to be understand that there is low wrap or no wrap and therefore there is at most a tack bond 34C (represented as a box with horizontal and vertical cross-hatching), which is not an effective bond, or no bond occurs at all. Bond site 34A would be the strongest bond as a result the highest contact area between warp and weft following by 34B and with 34C having the weakest bond.

Figure 12A:
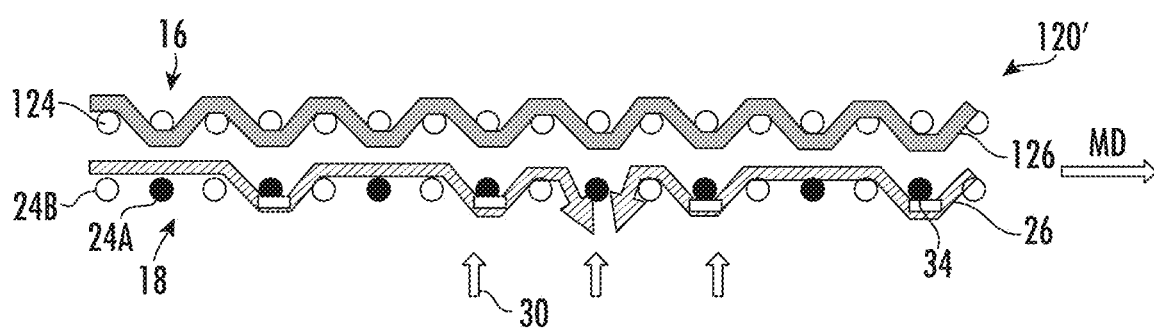
FIG. 12A is a schematic cross-sectional view showing the fabric seam area according to a second multilayer embodiment of the invention where laser energy is applied to the machine side surface only.
Figure 12B:
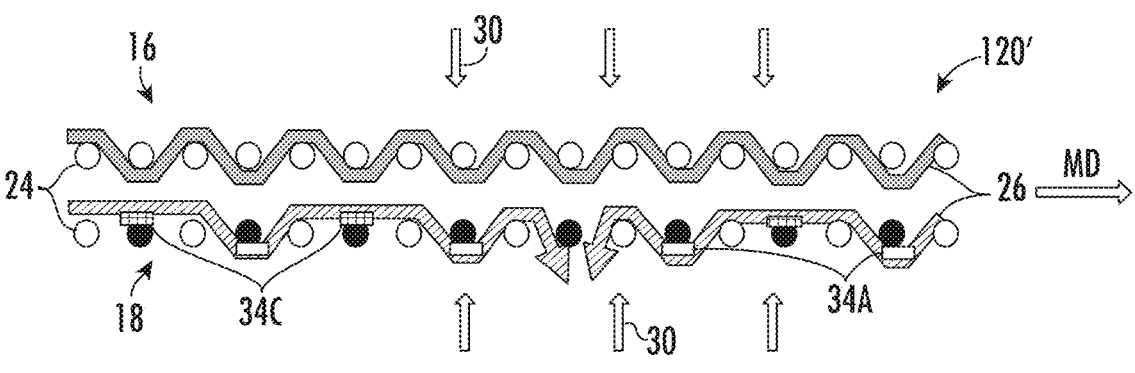
FIG. 12B is a schematic cross-sectional view showing the fabric seam area according to a second multilayer embodiment of the invention where laser energy is applied to both the support side surface and the machine side surface.
Figure 12C:
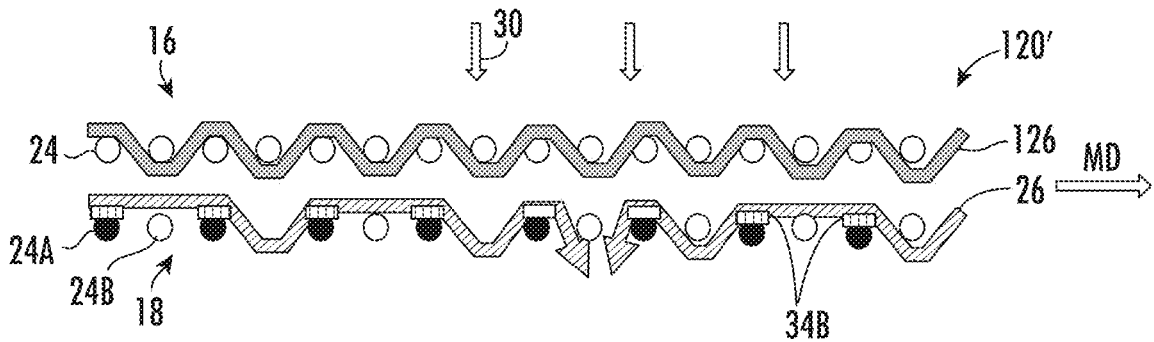
FIG. 12C is a schematic cross-sectional view showing the fabric seam area according to a second multilayer embodiment of the invention where laser energy is applied to the support side surface only.

FIGS. 12A-12C provide a second multilayer embodiment of a fabric seam area 120' where the machine side surface 18 comprises two systems of weft yarns 24A, 24B. The system of weft yarns 24A is formed of a composition that is compatible with and bondable to the system of warp yarns 26 with which it is woven and is formed at least in part of the laser energy absorbent material while the weft system 24B is formed of laser energy transparent material and is of a different material composition of the warp system that is not compatible to form bonds. The materials to be bonded to each other must comprise materials of like compatibility in order to bond to each other. In these embodiments the warp system 26 on the machine side surface 18 as well as the weft system 124 and the warp system 126 on the support side surface are also formed of laser energy transparent material. In this particular embodiment the machine side surface 18 weft systems 24A, 24B alternate in position at a 50% ratio. These systems could be at ratios other than 50% but all the like bondable material would be formed at least in part of the laser energy absorbent material.

FIG. 12A is similar to FIG. 11A in that it provides laser energy 30 to the machine side surface 18 resulting in bonds 34 between the system of warp yarns 26 and the system of weft yarns 24A at locations at which the system of warp yarns 26 pass under the system of weft yarns 24A formed at least in part of the laser energy absorbent material. No bonds are formed between any of the intersections between the system of warp yarns 26 and the system of weft yarns 24B as neither of these systems comprise yarns formed at least in part of laser energy absorbent material. In a similar manner FIG. 12B provides laser energy 30 to both the support side surface 16 and the machine side surface 18 resulting in bonds 34 between the system of warp yarns 26 and the system of weft yarns 24A at locations at which the system of warp yarns 26 pass under the system of weft yarns 24A formed at least in part of the laser energy absorbent material as well as at locations at which the system of warp yarns 26 pass over the system of weft yarns 24A. FIG. 12C provides laser energy 30 to the support side surface 16 resulting in bonds 34 between the system of warp yarns 26 and the system of weft yarns 24A at locations at which the system of warp yarns 26 pass over the system of weft yarns 24A formed at least in part of the laser energy absorbent material.

Figure 13A:
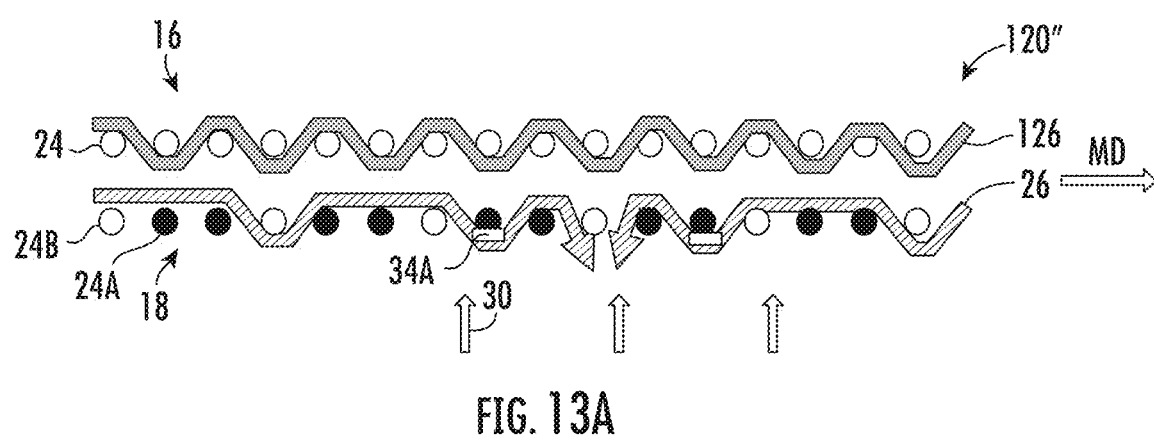
FIG. 13A is a schematic cross-sectional view showing the fabric seam area according to a third multilayer embodiment of the invention where laser energy is applied to the machine side surface only.
Figure 13B:
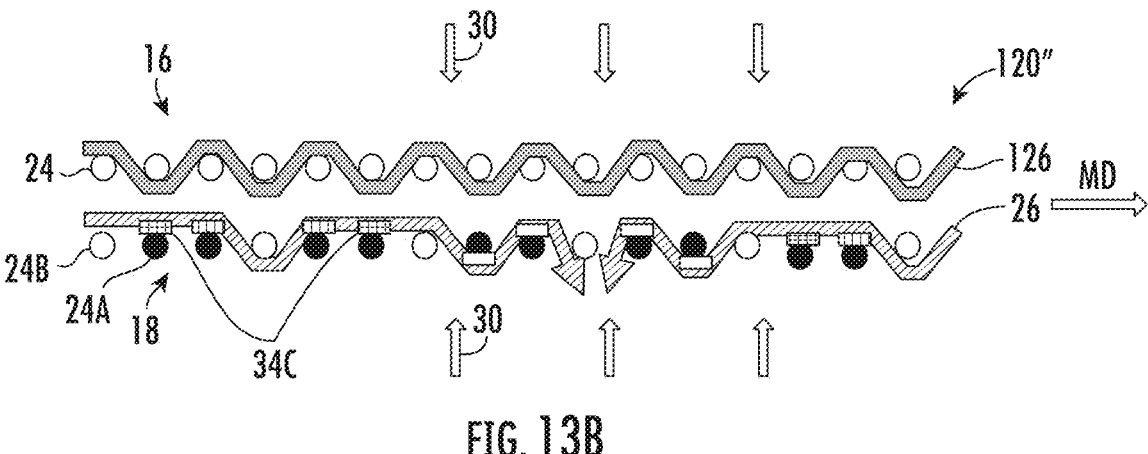
FIG. 13B is a schematic cross-sectional view showing the fabric seam area according to a third multilayer embodiment of the invention where laser energy is applied to both the support side surface and the machine side surface.
Figure 13C:
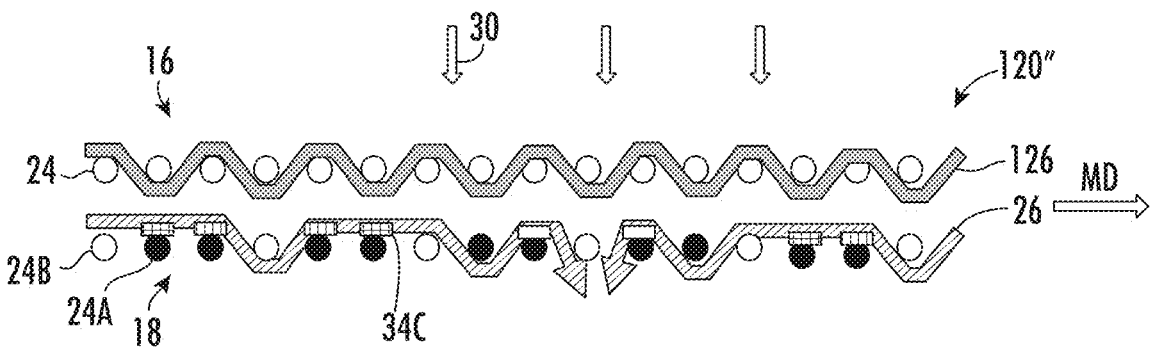
FIG. 13C is a schematic cross-sectional view showing the fabric seam area according to a third multilayer embodiment of the invention where laser energy is applied to the support side surface only.

FIGS. 13A-13C are similar to FIGS. 12A-12C in that the machine side surface 18 comprises two systems of weft yarns 24A, 24B, however in FIGS. 13A-13C the system of weft yarns 24A formed at least in part of the laser energy absorbent material accounts for two thirds of the machine side surface 18 weft yarns 24.

Referring generally to multilayer fabrics, it is possible that the system of warp yarns includes first and second systems of warp yarns formed at least in part of a laser energy absorbent material located respectively in the layers at each of the top and bottom surfaces of the fabric or that the system of weft yarns includes first and second systems of weft yarns formed at least in part of a laser energy absorbent material located respectively in the layers at each of the top and bottom surfaces of the fabric. However, it will be understood by the person skilled in the art from this disclosure that the laser energy absorbent material can be provided in the system of weft yarns in each layer or the system of warp yarns in each layer or the system of weft yarns in one surface's layer and the system of warp yarns in the other surface's layer, provided that in the layer at each surface of the fabric the system of warp yarns or the system of weft yarns with which the system of weft yarns or the system of warp yarns formed at least in part of the energy absorbent material is interwoven with is formed of laser energy transparent material. The above embodiments of the fabric assembly are considered to be exemplary and both the weave patterns of the woven fabrics as well as the selection of either the warp or weft yarns to be formed at least in part of the laser energy absorbent material can be varied in order to achieve a desired flexibility and/or shear resistance of the fabric. This prevents the fabric seam area from becoming too rigid due to unwanted bonding of the warp yarns and weft yarns in the woven fabric. The laser energy may be applied to either the support side surface, or the machine side surface, or both surfaces.

While the embodiments are described in terms of laser welding and laser energy being applied, those skilled in the art will recognize that the bonds can be formed using other types of energy applied to the fabric seam area using these principles, where at least the weft or the warp is formed at least in part of an energy absorbent material and for the other of the warp yarns or weft yarns not formed at least in part of the laser energy absorbent material, all of the warp yarns or weft yarns are formed of a laser energy transparent material such that bonding takes place when energy is applied where there is energy transparent material between the energy and the portion of the woven base fabric that includes the energy absorbent material.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

The invention claimed is:

1. A seamed woven fabric, comprising:
a system of warp yarns interwoven with a system of weft yarns in a repeating pattern to define a woven fabric having ends interconnected in a seam area,
wherein the system of weft yarns includes yarns formed at least in part of a laser energy absorbent material, and
in the seam area of the seamed woven fabric, all of the weft yarns in the system of weft yarns are formed at least in part of the laser energy absorbent material, and laser fused bonds are formed between at least some of the warp yarns that are formed of a laser transparent material and the weft yarns in the seam area that are formed at least in part of the laser energy absorbent material only at points where the warp yarns pass between applied laser energy applied to an entirety of the seam area and the weft yarns formed at least in part of the laser energy absorbent material such that the laser fused bonds are evenly distributed throughout the seam area resulting in a uniform air permeability profile for uniform airflow and a level of bond sites that strengthens the seam area and provides flexibility.

2. The seamed woven fabric of claim 1, wherein the warp yarns and the weft yarns formed at least in part of the laser energy absorbent material are formed of a thermoplastic material.

3. The seamed woven fabric of claim 1, wherein the laser fused bonds are located between the warp yarns that form part of a top surface at locations at which said warp yarns pass over the weft yarns that are formed at least in part of the laser energy absorbent material.

4. The seamed woven fabric of claim 1, wherein the laser fused bonds are located where the warp yarns that form part of the bottom surface at locations at which said warp yarns pass under the weft yarns formed at least in part of the laser energy absorbent material.

5. The seamed woven fabric of claim 1, wherein the laser fused bonds are located where the warp yarns pass over and under the weft yarns formed at least in part of laser energy absorbent material.

6. The seamed woven fabric of claim 1, wherein the woven fabric comprises a single layer weave.

7. The seamed woven fabric of claim 1, wherein the woven fabric comprises a multilayer weave, and the system of weft yarns includes first and second systems of weft yarns, and the first system of weft yarns includes all of the weft yarns in one of the fabric layers in the seam area that are formed at least in part of the laser energy absorbent material, and the second system of weft yarns in a different fabric layer in the seam area includes weft yarns that are formed of a laser transparent material.

8. The seamed woven fabric of claim 7, wherein the first system of weft yarns that includes the weft yarns in the seam area that are all formed at least in part of a laser energy absorbent material forms part of the bottom surface.

9. The seamed woven fabric of claim 8, wherein the laser energy is applied from both surfaces of the woven fabric in the seam area such that the laser fused bonds are formed at locations where the warp yarns pass over and under the weft yarns in the first system of weft yarns that are all formed at least in part of the laser energy absorbent material.

10. The seamed woven fabric of claim 1, wherein the woven fabric is a papermaking fabric.

11. The seamed woven fabric of claim 1, wherein the woven fabric is an industrial textile.

* * * * *